US012807839B2

(12) United States Patent
Hänsel et al.

(10) Patent No.: US 12,807,839 B2
(45) Date of Patent: Nov. 24, 2026

(54) POLYETHER-MODIFIED SILOXANES AS DUST BINDING AGENTS FOR SEED

(71) Applicant: Evonik Operations GmbH, Essen (DE)

(72) Inventors: René Hänsel, Dorsten (DE); Carsten Riedl, Bochum (DE)

(73) Assignee: Evonik Operations GmbH, Essen (DE)

( * ) Notice: Subject to any disclaimer, the term of this patent is extended or adjusted under 35 U.S.C. 154(b) by 145 days.

(21) Appl. No.: 18/920,354

(22) Filed: Oct. 18, 2024

(65) Prior Publication Data

US 2025/0043148 A1 Feb. 6, 2025

Related U.S. Application Data

(62) Division of application No. 17/608,936, filed as application No. PCT/EP2020/061589 on Apr. 27, 2020.

(30) Foreign Application Priority Data

May 8, 2019 (EP) .................................... 19173220

(51) Int. Cl.
*A01N 25/34* (2006.01)
*C09D 183/12* (2006.01)

(52) U.S. Cl.
CPC .......... *C09D 183/12* (2013.01); *A01N 25/34* (2013.01)

(58) Field of Classification Search
CPC .............................. C08G 77/46; C09D 183/12
USPC ........................................... 504/100; 556/445
See application file for complete search history.

(56) References Cited

U.S. PATENT DOCUMENTS

| | | | | |
|---|---|---|---|---|
| 3,649,321 A | | 3/1972 | Durrant et al. | |
| 5,159,096 A | * | 10/1992 | Austin | C08G 77/46 556/444 |
| 5,234,495 A | | 8/1993 | Breneman et al. | |
| 6,593,436 B2 | | 7/2003 | Austin et al. | |
| 7,081,436 B2 | * | 7/2006 | Sun | A01C 1/06 504/100 |
| 11,123,765 B2 | | 9/2021 | Scheffler et al. | |
| 2004/0147703 A1 | | 7/2004 | Burkhart et al. | |
| 2014/0274685 A1 | * | 9/2014 | Huang | A01N 3/00 47/57.6 |
| 2016/0151805 A1 | | 6/2016 | Scheffler et al. | |
| 2021/0145010 A1 | * | 5/2021 | Hänsel | A23K 10/18 |

FOREIGN PATENT DOCUMENTS

| | | |
|---|---|---|
| EP | 1 439 200 | 7/2004 |
| WO | 02/058454 | 8/2002 |
| WO | 2012/168210 | 12/2012 |
| WO | 2013/158284 | 10/2013 |
| WO | 2016/149023 | 9/2016 |
| WO | 2020/161230 | 8/2020 |

OTHER PUBLICATIONS

European Search Report received for European Application No. 19173220.5, mailed on Jun. 28, 2019, 9 pages.
Indian Office Action received for Indian Application No. 202117056516, mailed on Jun. 14, 2022, 5 pages.
International Search Report received for PCT/EP2020/061589, mailed on Aug. 3, 2020, 7 pages.
Written Opinion received for PCT/EP2020/061589, mailed on Aug. 3, 2020, 9 pages.

* cited by examiner

*Primary Examiner* — Margaret G Moore

(74) *Attorney, Agent, or Firm* — Grüneberg Global IP, PLLC

(57) ABSTRACT

Polyether-modified siloxanes can be used as a dust binder for seed. Methods of reducing the evolution of dust from seed can be used with the polyether-modified siloxanes, and a treated seed is obtainable by these methods. Seed-dressing compositions or seed-dressing liquors contain the polyether-modified siloxanes.

19 Claims, No Drawings

POLYETHER-MODIFIED SILOXANES AS DUST BINDING AGENTS FOR SEED

CROSS-REFERENCE TO RELATED APPLICATIONS

This application is a divisional of U.S. application Ser. No. 17/608,936, filed on Nov. 4, 2021, which is a national stage entry under § 371 of PCT/EP2020/061589, filed on Apr. 27, 2020, which claims priority to European Patent Application No. 19173220.5, filed on May 8, 2019, the content of each of which is hereby incorporated by reference in its entirety.

BACKGROUND OF THE INVENTION

Field of the Invention

The present invention provides for the use of polyether-modified siloxanes as dust binder for seed, methods of reducing the evolution of dust from seed using polyether-modified siloxanes, treated seed obtainable by this use or by these methods, and seed-dressing compositions or seed-dressing liquors containing polyether-modified siloxanes.

Description of Related Art

Seed is dressed prior to sowing. Seed is understood to mean dry, dormant, generative propagation organs such as seeds, fruits, accessory fruits, infructescences or parts thereof. These contain the germs of the plants. Dressing or seed dressing in agriculture and forestry and in landscaping and gardening is understood to mean the treatment of seed with crop protection products and optionally additionally nutrients in order to protect the seed from fungal degradation and from pests. After the dressing, the seed has been ensheathed with a solid, dry and very substantially homogeneous layer. This sheath is usually coloured to indicate that the seed has been treated. The colouring is intended to prevent the accidental use of the dressed seed as animal feed or for food purposes. The formulations used for dressing are referred to as dressings, seed-dressing liquors or else as seed dressings. Seed dressings typically contain fungicides and/or insecticides as active crop protection ingredients. These active crop protection ingredients may be chemical or else biological in origin. Biological active crop protection ingredients used are typically specific fungal spores, bacteria or viruses. The active crop protection ingredients are usually used in the form of specific formulations. These are typically aqueous formulations in which the active crop protection ingredient is in concentrated form, also referred to hereinafter as seed-dressing composition or seed treatment composition. The usually water-insoluble active crop protection ingredients are dispersed here in the water with the aid of additives. This type of formulation is also called suspension concentrate. In these suspension concentrates, the active crop protection ingredient is dispersed in the form of small solid particles in water as dispersant (dispersing agent). Other seed formulations again are produced as emulsifiable concentrate. The organic crop protection products are dissolved here in an organic solvent that may contain emulsifiers and further additives. The commercial seed dressings based on aqueous suspension concentrates are generally more environmentally friendly than those based on emulsifiable concentrates. The seed-dressing compositions, just like conventional crop protection formulations, may likewise be formulated as oil dispersions, microemulsions or suspoemulsions, but these formulation types are less commonly used in seed dressings. The seed-dressing composition may contain further additives as well as crop protection agents and the additives mentioned, for example emulsifiers, dispersants, dyes or colour pigments. These additives include, for example, stickers. These stickers are intended to assure the adhesion of the crop protection material on the seed. The seed-dressing liquor is produced by diluting the seed-dressing composition in water. It takes the form of a dilute aqueous dispersion or emulsion. A customary seed-dressing liquor consists, for example, of:

- water (200 to 600 ml per 100 kg of seed),
- seed-dressing composition (seed treatment composition) (100 to 300 ml per 100 kg of seed),
- optionally further additives (20 to 100 ml per 100 kg of seed).

However, the composition may quite possibly also deviate from these figures. The seed-dressing liquor thus produced is applied to the seed with seed-dressing systems. Typically, for that purpose, the seed-dressing liquor is mixed with the seed in a continuous or batchwise process in the mixing drum (seed-dressing drum) of the seed-dressing system. The seed-dressing liquor is sprayed here by means of an impeller plate in the mixing drum containing the seed. The dosage is typically undertaken with a peristaltic pump; the end of the hose is typically just above the impeller plate. The procedure is typically such that the seed is introduced into the mixing drum, then the impeller plate is started and the seed-dressing liquor is finally sprayed in. The seed-dressing operation has typically ended after about 30 seconds. This may be followed by a drying process in which the water is removed. However, there is frequently no need for active removal of the water owing to the small amount of water which is used, and the water evaporates or is absorbed by the seed. The seed is subsequently generally bagged and supplied to the user in that form.

A very major problem in the sowing of the treated seed is the evolution of dust. The dust results from the abrasion of the crop protection formulation from the treated seed. The crop protection formulation can be rubbed off at the early stage of bagging of the dressed seed. In the course of sowing, the dust with its crop protection constituents can be distributed in the environment by wind. This is undesirable. The evolution of dust should be avoided as far as possible in order to avoid uncontrolled spread of the active crop protection ingredients present. Finally, the insecticides present in the seed-dressing products can harm beneficial insects, such as bees and bumblebees, and the fungicides present can be harmful to other plants. In order to reduce the evolution of dust, it is possible to use dust binders additionally or alternatively to the sticker. For that purpose, it is additionally possible to add a dust binder (anti-dusting agent) to the seed-dressing liquor as well as the seed-dressing composition. Alternatively, the dust binder may also already be a constituent of the seed-dressing composition.

Anti-dusting agents used are silicone oil emulsions, for example. Silicone oil emulsions can reduce abrasion by a lubrication effect, and increase seed flow during application. This is described, for example, in WO 2012/168210. However, silicone oil emulsions have the disadvantage that they lead to considerable cost and inconvenience associated with cleaning of the seed-dressing system since the silicone oils present are insoluble in water and most of the customary cleaning solvents.

In order to reduce the evolution of dust, it is also conceivable to increase the content of sticker. However, this is possible only to a limited degree since the flowability of the seed on sowing must be maintained, but flowability is adversely affected by the sticker.

U.S. Pat. No. 7,081,436 discloses seed treatment compositions which, to reduce dust formation, contain hydrocarbonoils having a boiling point of at least 150 °C as sticker. Preferred stickers disclosed are vegetable oil, for example rapeseed oil, petroleum-based hydrocarbon oils, paraffinic/naphthenic hydrocarbon oils, mineral oil, and mixtures thereof. These compounds too have the disadvantage of being insoluble in water, which complicates the cleaning of the seed-dressing system. In order to improve the water solubility, it would also be conceivable to use emulsifiers or to increase the amount of emulsifiers used. But this can have an adverse effect on the stability of the crop protection formulations. U.S. Pat. No. 7,081,436 additionally discloses the use of polyether-modified siloxanes in seed treatment compositions. However, the polyether-modified siloxanes are used with the aim of improving the colour intensity of the pigments present in the seed treatment composition and of assuring uniform coating of the seed treatment composition. By contrast, the polyether-modified siloxanes are not used to reduce dust formation. They are thus not used as dust binders.

SUMMARY OF THE INVENTION

The prior art anti-dusting agents thus have various disadvantages. The problem addressed by the present invention was therefore that of overcoming at least one disadvantage of the prior art. A particular problem addressed was that of providing an anti-dusting agent that reduces the evolution of dust in seed, and can additionally be readily removed with water in the cleaning of the seed-dressing system.

It has been found that, surprisingly, this problem is solved by polyether-modified siloxanes used as dust binders.

DETAILED DESCRIPTION OF THE INVENTION

Polyether-modified siloxanes lead to a reduction in the evolution of dust and are thus suitable as dust binders. They have the advantage of being water-soluble or water-emulsifiable. Systems that have come into contact with the compounds used as intended can thus be cleaned with water in an environmentally friendly manner. The use of additional emulsifiers that can have an adverse effect on the stability of crop protection formulations can be reduced or even avoided. There is also no need to use any organic solvents for cleaning.

The problem addressed by the present invention is therefore solved by the subject-matter of the description. Advantageous configurations of the invention are specified in the examples and the description.

The invention is described hereinafter by way of example, without any intention of limiting the invention to these illustrative embodiments. Where ranges, general formulae or classes of compounds are specified below, these are intended to encompass not only the corresponding ranges or groups of compounds which are explicitly mentioned but also all subranges and subgroups of compounds which can be obtained by removing individual values (ranges) or compounds. Any embodiment that can be obtained by combination of ranges/subranges and/or groups/subgroups, for example by combinations of inventive, essential, optional, preferred, preferable or preferably selected, further preferred, even further preferred, particularly preferred or especially preferred ranges/subranges and/or groups/subgroups, is fully incorporated into the disclosure-content of the present invention and is considered to be explicitly, directly and unambiguously disclosed. The expressions "preferably" and "preferentially" are used synonymously. The expressions "especially" and "especially preferably" are likewise used synonymously. Where documents are cited within the context of the present description, the entire content thereof is intended to be part of the disclosure of the present invention. In the case of compositions, the percentage figures, unless stated otherwise, are based on the overall composition. Where figures are given in percent hereinafter, these are percentages by weight unless stated otherwise. Where average values are reported hereinafter, these values are numerical averages unless stated otherwise. Where measurements or physical properties are reported hereinafter, unless stated otherwise, these are measurements or physical properties measured at 25 °C and preferably at a pressure of 101 325 Pa (standard pressure) and preferably a relative air humidity of 50%. The number-average molecular weight $M_N$ is determined by means of gel permeation chromatography (GPC) as per standard DIN 55672:2016, preferably as per standard DIN 55672-1:2016. Where numerical ranges in the form of "from X to Y" or "X to Y" are reported hereinafter, where X and Y are the limits of the numerical range, this is equivalent to the statement "from at least X up to and including Y", unless stated otherwise. Statements of ranges thus include the range limits X and Y, unless stated otherwise. Wherever molecules/molecule fragments have one or more stereocentres or can be differentiated into isomers on account of symmetries or can be differentiated into isomers on account of other effects, for example restricted rotation, all possible isomers are embraced by the present invention. Specific executions are defined hereinafter, and so features such as indices or structural constituents can be subject to restrictions by virtue of the execution. For all features unaffected by the restriction, the remaining definitions each remain valid. The word fragment "poly" encompasses in the context of this invention not just compounds having at least 2 repeat units of one or more monomers in the molecule, but preferably also compositions of compounds having a molecular weight distribution and having an average molecular weight of at least 200 g/mol. This definition takes account of the fact that it is customary in the field of industry in question to refer to such compounds as polymers even if they do not appear to conform to a polymer definition as per OECD or REACH guidelines. The various fragments in the formulae (I), (II), (III) and (IV) below may be in a statistical distribution. Statistical distributions may have a blockwise structure with any number of blocks and any sequence or they may be subject to a randomized distribution; they may also have an alternating structure or else form a gradient along the chain, if there is one; in particular, they can also form any mixed forms in which groups of different distributions may optionally follow one another. The divalent units ($OC_2H_3R^3$) in formulae (II) and (III) and [$CH_2CH(CH_3)O$] in formula (IV) may be bonded differently to the adjacent groups or atoms. In formula (II) and formula (III), ($OC_2H_3R^3$) is in each case independently a radical of the [$CH_2CH(R^3)O$] form and/or of the [$CH(R^3)CH_2O$] form, but preferably a radical of the [$CH_2CH(R^3)O$] form. Correspondingly, [$CH_2CH(CH_3)O$] in formula (IV) is in each case independently a radical of the [$CH_2CH(CH_3)O$] form and/or of the [$CH(CH_3)$ $CH_2O$] form, but preferably a radical of the formula [$CH_2CH(CH_3)O$]. The formulae (I), (II) (III) and (IV) describe compounds that are constructed from repeat units, for example repeating fragments, blocks or monomer units, and may have a molar mass distribution. The frequency of the repeat units is reported by indices. The corresponding indices are the numerical average over all repeat units. The indices a, b, c, c(1), c(2), c(3), c(4) and optionally d used in the formulae should be regarded as statistical averages (number averages). Index d may alternatively be an integer. The indices a, b, c, c(1), c(2), c(3), c(4) and optionally d used and also the value ranges of the reported indices are thus understood to be averages of the possible statistical distribution of the structures that are actually present and/or mixtures thereof. The polyether-modified siloxanes to be used in accordance with the invention are preferably in the form of equilibrated mixtures. Specific embodiments may lead to restrictions to the statistical distributions as a result of the embodiment. There is no change in the statistical distribution for all regions unaffected by the restriction. The term "unsaturated" describes the presence of one or more carbon-carbon triple bonds and/or carbon-carbon double bonds that are not part of an aromatic ring. The terms "dust binder" and "anti-dusting agent" are equivalent.

The present invention firstly provides for the use of at least one polyether-modified siloxane as dust binder for seed.

The inventive use of the polyether-modified siloxanes leads to a reduction in the evolution of dust. Furthermore, systems that have come into contact with the compounds used as intended can be cleaned with water in an environmentally friendly manner.

Without being bound by any theory, it is assumed that the siloxane component of the polyether-modified siloxane, similarly to the case of silicone oils, reduces dust formation, and the polyether component of the polyether-modified siloxane in turn enables solubility or emulsifiability in water.

A polyether-modified siloxane is understood to mean a compound having organic radicals bonded to silicon atoms and structural units of the formula ≡Si—O—Si≡, where "≡" represents the three remaining valencies of the silicon atom in question and where at least one organic radical comprises a polyether radical. Preferably, the polyether-modified siloxanes are compounds that are composed of units selected from the group consisting of $M=[R^1{}_3SiO_{1/2}]$, $D=[R^1{}_2SiO_{2/2}]$, $T=[R^1{}_3SiO_{2/2}]$ and optionally additionally have units of the formula $Q=[R^1{}_4SiO_{3/2}]$ where $R^1$ is a monovalent organic radical and at least one $R^1$ radical is a monovalent polyether radical $R^2$ and all the remaining $R^1$ radicals are monovalent hydrocarbyl radicals R. The $R^1$ or R and $R^2$ radicals may each be selected independently of one another and, compared in pairs, are the same or different.

It is preferable that the at least one polyether-modified siloxane used has 41 to 81, preferably 43 to 75 and especially 45 to 70 silicon atoms.

The use of these polyether-modified siloxanes as dust binders in the dressing of seed has the advantage that the treated seed shows only a very low tendency to evolve dust.

It is further preferable that the at least one polyether-modified siloxane is a compound of the general formula (I)

Formula (I)

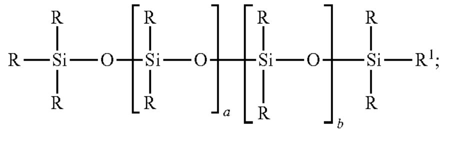

where:

R is in each case independently selected from the group consisting of monovalent hydrocarbyl radicals having 1 to 18 carbon atoms, preferably in each case independently selected from the group consisting of methyl, ethyl, propyl and phenyl, especially methyl;

$R^1$ is in each case independently selected from the group consisting of R and $R^2$, preferably R, especially methyl;

$R^2$ is in each case independently selected from the group consisting of monovalent polyether radicals of the general formula (II)

$$-Z[(OC_2H_3R^3)_cOR^4]_d \quad \text{Formula (II);}$$

Z is in each case independently selected from the group consisting of (d+1)-valent hydrocarbyl radicals that are optionally interrupted by oxygen atoms and have 2 to 10, preferably 3 to 4 and especially 3 carbon atoms;

$R^3$ is in each case independently selected from the group consisting of H and monovalent hydrocarbyl radicals having 1 to 8 carbon atoms, preferably in each case independently selected from the group consisting of H, methyl, ethyl and phenyl, especially in each case independently selected from the group consisting of H and methyl;

$R^4$ is in each case independently selected from the group consisting of H, monovalent hydrocarbyl radicals having 1 to 8 carbon atoms and acyl radicals having 1 to 8 carbon atoms, preferably in each case independently selected from the group consisting of H, methyl and acetyl, especially H;

a=31 to 74, preferably 33 to 70, especially 35 to 60;

b=6 to 50, preferably 6 to 30, especially 6 to 15;

c=3 to 100, preferably 5 to 50, especially 10 to 30;

d=1 to 3, preferably 1 to 2, especially 1.

Since it is preferable that the at least one polyether-modified siloxane has 41 to 80, preferably 43 to 75 and especially 45 to 70 silicon atoms, it is preferably correspondingly the case that a+b+2=41 to 80, preferably 43 to 75, especially 45 to 70.

In respect of the at least one polyether-modified siloxane of the general formula (I), it is preferably additionally the case that: R=methyl, $Z=-CH_2CH_2CH_2-$, $R^4$=H and d=1.

Preferably, the divalent polyether radicals $(OC_2H_3R^3)_c$ are each independently selected from radicals of the general formula (III)

$$(OC_2H_4)_{c(1)}(OC_3H_6)_{c(2)}(OC_4H_8)_{c(3)}(OC_2H_3Ph)_{c(4)} \quad \text{Formula (III)}$$

in which:

Ph is phenyl;

with:

c(1)=1 to 100, preferably 4 to 50, especially 8 to 30;

c(2)=0 to 70, preferably 1 to 40, especially 3 to 20;

c(3)=0 to 5, preferably 0 to 2, especially 0;

c(4)=0 to 5, preferably 0 to 2, especially 0;

with the proviso that:

c(1)+c(2)+c(3)+c(4)=c.

It is accordingly preferable that the monovalent polyether radical $R^2$ of the general formula (II) comprises one or more divalent polyether radicals of the general formula (III) that are based on ethylene oxide, propylene oxide, butylene oxide and/or styrene oxide or mixtures thereof.

It is particularly preferable that the monovalent polyether radical $R^2$ of the general formula (II) comprises one or more divalent polyether radicals of the general formula (III) that are based on ethylene oxide and/or propylene oxide, but not on butylene oxide and styrene oxide. It is thus particularly preferable that: c(3)=c(4)=0. This further improves the solubility of the polyether-modified siloxane in water.

It is preferable that $R^2$ is in each case independently selected from radicals of the general formula $—CH_2CH_2CH_2O[C_2H_5O]_{c(1)}[CH_2CH(CH_3)O]_{c(2)}H$. The corresponding polyether-modified siloxane is obtainable, for example, by hydrosilylation of a terminally unsaturated polyether of the general formula $CH═CHCH_2O[C_2H_5O]_{c(1)}[CH_2CH(CH_3)O]_{c(2)}H$ with an SiH-functional siloxane. Preferably, $R^2$ thus derives from a terminally unsaturated polyether of the general formula $CH═CHCH_2O[C_2H_5O]_{c(1)}[CH_2CH(CH_3)O]_{c(2)}H$, where the polyether is in turn obtainable from the reaction of ethylene oxide and optionally propylene oxide with allyl alcohol.

Particular preference is accordingly given to the use of at least one polyether-modified siloxane of the general formula (IV)

$$Me_3SiO[SiMe_2O]_a[SiMeR^2O]_bSiMe_3 \quad \text{Formula (IV)}$$

with $R^2$=in each case independently selected from monovalent radicals of the formula $—CH_2CH_2CH_2O[C_2H_5O]_{c(1)}[CH_2CH(CH_3)O]_{c(2)}H$;

a=31 to 74, preferably 33 to 70, especially 35 to 60;

b=6 to 50, preferably 6 to 30, especially 6 to 15;

c(1)=1 to 100, preferably 4 to 50, especially 8 to 30;

c(2)=0 to 70, preferably 1 to 40, especially 3 to 20;

with the proviso that:

c(1)+c(2)=3 to 100, preferably 5 to 50, especially 10 to 30;

as dust binder for seed, where the indices a, b, c(1), c(2) are as defined in formula (I), (II) or (III).

It is further preferable that the number of oxyethylene groups ($OC_2H_4$) relative to the number of ($OC_2H_3R^3$) groups with $R^3≠H$ in the polyether-modified siloxane is in a ratio of 0.5 to 20, preferably of 0.6 to 10, especially of 0.8 to 6. It is thus preferably the case that: c(1)/(c(2)+c(3)+c(4))=0.5 to 20, preferably 0.6 to 10, especially 0.8 to 6. This has the advantage that the solubility of the polyether-modified siloxane in water is further improved. Correspondingly, it is also preferable that the proportion by mass of oxyethylene groups ($OC_2H_4$) based on the total mass of all ($OC_2H_3R^3$) groups in the polyether-modified siloxane is from 35% to 95%, preferably from 40% to 90%, especially from 45% to 85%.

Preferably, the number-average molecular weight $M_N$ of $R^2$ is from 200 g/mol to 2500 g/mol, preferably from 400 g/mol to 2000 g/mol, especially from 500 g/mol to 1500 g/mol. The number-average molecular weight $M_N$ of $R^2$ is defined here as the number-average molecular weight $M_N$ of the corresponding unsaturated polyether used in the preparation of the polyether-modified siloxane and is determined by means of gel permeation chromatography (GPC) to standard DIN 55672:2016, preferably to standard DIN 55672-1:2016.

It is further preferable that the divalent polyether radical $(OC_2H_3R^3)_c$ or the polyether radical $R^2$ calculated without the Z radical and without the $OR^4$ radical has a molar mass M(PE) of 140 g/mol to 2460 g/mol, preferably of 360 g/mol to 1940 g/mol, especially of 440 g/mol to 1460 g/mol. The molar mass M(PE) is calculated by the equation:

$$M(PE)=44\ \text{g/mol}*c(1)+58\ \text{g/mol}*c(2)+72\ \text{g/mol}*c(3)+120\ \text{g/mol}*c(4)$$

where c(1), c(2), c(3) and c(4) relate to the indices in formula (III).

Z is in each case independently selected from the group consisting of (d+1)-valent hydrocarbyl radicals that are optionally interrupted by oxygen atoms and have 2 to 10, preferably 3 to 4 and especially 3 carbon atoms. It is further preferable that Z is a divalent or trivalent radical. Z is preferably selected from the group consisting of:

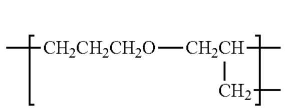
,
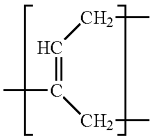
,
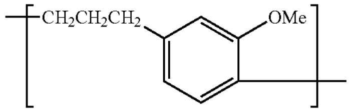
,
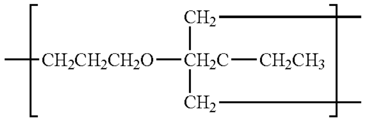
, $—CH_2CH(CH_3)CH_2—$, $CH_2CH_2CH(CH_3)_2—$, $—CH_2CH_2C(CH_3)_2—$, $—CH_2CH_2CH_2—$, $—CH_2CH_2—$;

further preferably selected from the group consisting of:

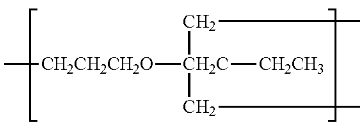
,
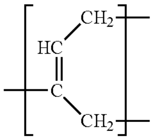

and $—CH_2CH_2CH_2—$;

especially $—CH_2CH_2CH_2—$;

where the Z radicals in the representation chosen above are bonded to a silicon atom of the siloxane skeleton on the left and to one or two radicals of the formula $(OC_2H_3R^3)_cOR^4$ as per formula (I) on the right.

Preferably, the polyether-modified siloxanes to be used in accordance with the invention have a cloud point of greater than 30 °C. The cloud point can be determined as for mineral oil products according to standard DIN EN 23015:1994-05 or standard DIN EN ISO 3015:2018-04.

Particular preference is given to the use of at least one polyether-modified siloxane of the general formula (IV)

$$Me_3SiO[SiMe_2O]_a[SiMeR^2O]_bSiMe_3 \quad \text{Formula (IV)}$$

with $R^2$=in each case independently selected from radicals of the formula $—CH_2CH_2CH_2O[C_2H_5O]_{c(1)}[CH_2CH(CH_3)O]_{c(2)}H$;

a=35 to 45;

b=6 to 11;

c(1)=8 to 20;

c(2)=3 to 9;

as dust binder for seed, where the indices a, b, c(1), c(2) are as defined in formula (I), (II) or (III). The dust values are particularly significantly reduced in the case of use of this polyether-modified siloxane.

Preferably, the polyether-modified siloxanes used are largely or completely biodegradable. Biodegradability here is preferably determined by the OECD 301 F method. More preferably, biodegradability is determined in accordance with OECD 301 F after 28 days at 22 °C. Further preferably, biodegradability is determined as in EP 3106033 A1, especially as described in the examples therein. It is preferable here that the polyether-modified siloxanes have a biodegradability of not less than 60%, especially of not less than 65%, the maximum value being 100%.

The polyether-modified siloxanes can be obtained, for example, in the manner known to the person skilled in the art by hydrosilylation from the corresponding unsaturated polyethers and the corresponding SiH-functional siloxanes. The process preferably used for preparation of the polyether-modified siloxanes according to the invention is a transition metal-catalysed hydrosilylation of the unsaturated polyethers with SiH-functional siloxanes to form Si—C linkages, as described, for example, in EP 1520870, EP 1439200, EP 1544235, U.S. Pat. Nos. 4,147,847, 4,025,456, EP 0493836 or U.S. Pat. No. 4,855,379 and the documents cited therein. Preference is given to using a platinum catalyst for catalysis of the hydrosilylation.

The preparation of the unsaturated polyethers used in the hydrosilylation, on which the radicals of the formula (II) are based, preferably allyl polyethers, is likewise known from the prior art. For example, EP 1360223 and the documents cited therein describe the preparation of unsaturated polyethers with and without derivatization of the OH functionality. U.S. Pat. Nos. 5,877,268 and 5,856,369 describe the preparation of allyl-started polyethers using DMC catalysis. DE 19940797 describes the preparation and use of polyalkylene oxides using potassium methoxide as catalyst. Further processes are described in U.S. Pat. Nos. 3,957,843, 4,059,605, 3,507,923, DE 102005001076 and DE 3121929.

According to the invention, the polyether-modified siloxanes are used as dust binders for seed.

A dust binder reduces dust formation in seed that has been treated with a seed-dressing composition or a seed-dressing liquor. A measure preferably employed for the dust binding capacity, i.e. for the reduction in the evolution of dust, and hence for the efficacy of an additive as dust binder, is the dust value, which is determined with the aid of the Heubach test (ESA 11.0387, ESA STAT Dust Working Group, Version 1.0 of 23.03.2011) as described in the examples. If the dust value can be lowered by the addition of the additive to the seed-dressing composition or to the seed-dressing liquor, the additive is a suitable dust binder. For this purpose, the dust value of seed that has been treated with a seed-dressing liquor containing the additive is compared to the dust value of seed that has been treated in the same way but with a seed-dressing liquor that does not contain the additive.

The binding of dust in the seed treated can be adjusted via the amount of the polyether-modified siloxane. Preferably, the at least one polyether-modified siloxane is used in such a way that the proportion by mass of the at least one polyether-modified siloxane based on the total mass of the treated seed is from 0.001 ppm to 1000 ppm, preferably 0.01 ppm to 100 ppm, especially 0.1 ppm to 10 ppm.

Seed is understood by the person skilled in the art to mean dry, dormant, generative propagation organs such as seeds, fruits, accessory fruits, infructescences or parts thereof. They contain the complete germ of the plants that has resulted from pollination. The seed used preferably comprises grains from the grass family. The grass family (Poaceae=Gramineae) is a family of plants in the order of the Poales. These grains are also referred to as cereal grains. The grains are especially preferably selected from the group consisting of the grains of wheat, rye, barley, oats, triticale, rice, maize and millet/sorghum.

The seed is treated as described by way of introduction.

The invention therefore further provides a method of reducing dust formation in seed, comprising the steps of:

a. providing seed,
b. treating the seed with at least one polyether-modified siloxane.

The polyether-modified siloxane may be part here of the seed-dressing liquor or of the seed-dressing composition.

The invention therefore further provides a seed-dressing liquor or a seed-dressing composition comprising the at least one polyether-modified siloxane.

The polyether-modified siloxanes used as intended are preferably used in aqueous compositions. The compositions used as intended, i.e. the seed-dressing composition or seed-dressing liquor, preferably do not include any emulsifiers. It is further preferable that the compositions used as intended include further ingredients selected from fungicides, insecticides, pesticides, herbicides, nematicides, fertilizers, nutrients, microorganisms, stickers, pigments, surfactants, dispersants (dispersing agents), free-flow aids and defoamers.

The seed-dressing liquor is preferably an aqueous dilute dispersion or emulsion. The seed-dressing liquor preferably comprises:

- water, preferably in an amount of 200 to 600 ml per 100 kg of seed;
- seed-dressing composition (seed treatment composition), preferably in an amount of 100 to 300 ml per 100 kg of seed;
- optionally further additives, preferably in an amount of 20 to 100 ml per 100 kg of seed.

The ingredients listed above, i.e. the fungicides, insecticides, pesticides, herbicides, nematicides, fertilizers, nutrients, microorganisms, stickers, pigments, surfactants, dispersants, free-flow aids or defoamers, and the polyether-modified siloxane, are preferably part of the seed-dressing composition, but may also be added to the seed-dressing liquor as a further additive.

As described by way of introduction, the seed is initially introduced into the mixing drum (seed drum) of a seed-dressing system and the seed-dressing liquor is added continuously or batchwise and mixed with the seed. The seed-dressing liquor is preferably sprayed here by means of an impeller plate in the mixing drum containing the seed. For example, in a first step, the seed is introduced into the mixing drum, the impeller plate is started and the liquor is sprayed in. The seed-dressing operation has preferably ended after 30 seconds. This may be followed by a drying process in which the water is removed. There is preferably no active removal of the water. The treated seed has preferably been coated homogeneously with the nonaqueous constituents of the seed-dressing liquor. The treated seed is subsequently preferably bagged and supplied to the user in that form.

The invention therefore further provides treated seed obtainable by the inventive use of the at least one polyether-modified siloxane and/or the method according to the invention.

The invention therefore also further provides treated seed comprising seed and the at least one polyether-modified siloxane.

The examples adduced hereinafter illustrate the present invention by way of example, without any intention of restricting the invention, the scope of application of which is apparent from the entirety of the description, to the embodiments specified in the examples.

EXAMPLES

General Methods:

Determination of Dust Value:

The determination of the dust values is conducted by the ESA 11.0387 (ESA STAT Dust Working Group, Version 1.0 of 23.03.2011) method. This involves conducting the Heubach test "Assessment of free floating dust and abrasion particles of treated seeds as a parameter of the quality of treated seeds" with a dustmeter from Heubach, type 1, according to the instructions. The Heubach test is the standard test conducted in industry for determining the dusting tendency of dressed seed. In the Heubach test, the adhesion or abrasion of the seed-dressing composition on the seed is measured. This is done by introducing 100 g of dressed seed into a drum that subsequently rotates. This subjects the seed to mechanical stress; an air stream is guided through the system. The seed dusts detached are sucked onto a filter unit, and the filter is weighed. The result is the Heubach value, which is often reported in g of dust per dt of dressed seed, but also g of dust per 100 000 seed grains. A calculated value of g of dust per ha is often also found.

Characterization of the Siloxanes:

The siloxanes can be characterized with the aid of $^1H$ NMR and $^{29}Si$ NMR spectroscopy. These methods, especially taking account of the multiplicity of the couplings, are familiar to the person skilled in the art.

Determination of the SiH Values:

The SiH values of the SiH-functional siloxanes used, and also those of the reaction matrices, are determined in each case using a gas-volumetric method by the sodium butoxide-induced decomposition of weighed aliquots of samples, using a gas burette. When the hydrogen volumes measured are inserted into the general gas equation, they allow determination of content of active SiH functions in the starting materials, and also in the reaction mixtures, and thus allow monitoring of conversion. A solution of sodium butoxide in butanol is used (5% by weight of sodium butoxide).

Synthesis of Polyether-Modified Siloxanes:

Example 1

17.8 g of polymethylhydrosiloxane (CAS: 63148-57-2, Gelest Inc., Code HMS-992 $M_{eq.}$=63.8 g/mol SiH, i.e. 63.8 g based on the number of SiH groups) were mixed with 3.5 g of hexamethyldisiloxane and 78.7 g of octamethylcyclotetrasiloxane, and 0.1 g of trifluoromethanesulfonic acid (purity: 99% by weight) was added. The mixture was stirred at room temperature for 24 h. Subsequently, 2 g of $NaHCO_3$ were added and the mixture was stirred for 4 h. The mixture was filtered. A clear liquid was obtained. The siloxane obtained was characterized with the aid of $^{29}Si$ NMR spectroscopy. An SiH-functional siloxane of the empirical formula $Me_3SiO[SiMe_2O]_{38}[SiMeHO]_{10}SiMe_3$ was obtained. To prepare the polyether-modified polyethersiloxane, the SiH-functional siloxane was reacted with an unsaturated polyether in a hydrosilylation reaction. The hydrosilylation reaction was conducted in the presence of a complete platinum(0)-1,3-divinyl-1,1,3,3-tetramethyldisiloxane solution in xylene (purchased from Sigma-Aldrich, Pt content: 2% by weight) as Karstedt catalyst. The hydrosilylation reaction was brought to full conversion in relation to the hydrogen content of the SiH-functional siloxanes. In the context of the present disclosure, a full conversion is understood to mean that more than 99% of the SiH functions were converted. Detection is effected in the manner familiar to the person skilled in the art by gas-volumetric means after alkaline breakdown. Specifically, 262 g of an unsaturated polyether of the empirical formula $CH_2{=}CHCH_2O[C_2H_5O]_{13.9}[CH_2CH(CH_3)O]_{5.3}H$ were mixed with 70 g of the SiH-functional siloxane of the formula empirical $Me_3SiO[SiMe_2O]_{38}[SiMeHO]_{10}SiMe_3$ obtained beforehand in a 500 ml three-neck flask with precision glass stirrer and reflux condenser under a nitrogen blanket. The mixture was heated to 90 °C. Subsequently, 0.16 g of a solution of the Karstedt catalyst in xylene (Pt content 2% by weight) was added to the mixture. An exothermic reaction set in. This was followed by stirring at 90 °C for 2 h. A clear liquid was obtained. The conversion of SiH functions was 100%. The reaction product obtained was a polyether-modified siloxane of the empirical formula $Me_3SiO[SiMe_2O]_{38}[SiMeR^2O]_{10}SiMe_3$ with $R^2$=—$CH_2CH_2CH_2O[C_2H_5O]_{13.9}[CH_2CH(CH_3)O]_{5.3}H$.

Example 2

Analogously to the mode of preparation of Example 1, an SiH-functional siloxane of the empirical formula $Me_3SiO[SiMe_2O]_{20}[SiMeHO]_{5.5}SiMe_3$ was first prepared and then reacted in a hydrosilylation reaction with a polyether of the empirical formula $CH_2{=}CHCH_2O[C_2H_5O]_{12.5}[CH_2CH(CH_3)O]_{3.3}H$. The reaction product obtained was a polyether-modified siloxane of the empirical formula $Me_3SiO[SiMe_2O]_{20}[SiMeR^2O]_{5.5}SiMe_3$ with $R^2$=–$CH_2CH_2CH_2O[C_2H_5O]_{12.5}[CH_2CH(CH_3)O]_{3.3}H$.

Production and Examination of the Dressed Seeds:

The seed dressings (seed-dressing liquors, dressings) were blended with the additives to be examined for their dust-reducing effect by simply blending water and a commercial suspension concentrate for seed treatment for wheat and barley (Landor® CT from Syngenta). Additives examined were the polyether-modified siloxane from Example 1 and 2, a commercially available polyether-modified siloxane from Momentive (Example 3), the commercially available anti-dusting agent MaximalFlow® from BASF (Example 4), and a further additive based on a silicone oil emulsion (Example 5). The Landor® CT suspension concentrate used is a mixture of fludioxonil, difenoconazole and tebuconazole for treatment of seed, for example wheat and barley. It was used in the customary amount of 200 ml per 100 kg of seed. The amount of water used was likewise 200 ml per 100 kg of seed. The amounts of the additives used can be found in Table 1. MaximalFlow® (Example 4) was used in the amount recommended by the manufacturer of 20 ml per 100 kg of seed. The polyether-modified polyethersiloxanes were correspondingly likewise used at 20 ml per 100 kg of seed, and Example 1 additionally also at 10 ml per 100 kg of seed. The silicone oil-based additive of Example 5 (a 35% silicone oil emulsion) was used in an amount of 60 ml per 100 kg of seed. The seed-dressing liquors thus produced were applied to 1 kg of seed (wheat) in each case by means of a standard seed-dressing system (mixing system based on the rotor-stator principle). Subsequently, by means of the Heubach test, the dust values reported in g of dust per 100 kg of seed were determined (see Table 1).

TABLE 1

Compositions of the seed-dressing liquors (dressings) (stated amounts of the components in ml per 100 kg of seed); dust values of the dressed seeds according to Heubach test (figures in g of dust per 100 kg of seed, ESA 11.0387, ch. 5.7)

| | Dressings | | | | | | |
|---|---|---|---|---|---|---|---|
| | 0 | 1a | 1b | 2 | 3 | 4 | 5 |
| Example 1 Polyether-modified siloxane $Me_3SiO[SiMe_2O]_{38}[SiMeR^2O]_{10}SiMe_3$ with $R^2$ = $CH_2CH_2CH_2O[C_2H_5O]_{13.9}[CH_2CH(CH_3)O]_{5.3}H$ | | 10 | 20 | | | | |
| Example 2 Polyether-modified siloxane $Me_3SiO[SiMe_2O]_{20}[SiMeR^2O]_{5.5}SiMe_3$ with $R^2$ = $CH_2CH_2CH_2O[C_2H_5O]_{12.5}[CH_2CH(CH_3)O]_{3.3}H$ | | | | 20 | | | |
| Example 3 Polyether-modified trisiloxane Silwet ® L 77 (Momentive) * | | | | | 20 | | |
| Example 4 Silicone oil emulsion ** MaximalFlow ® (BASF) | | | | | | 20 | |
| Example 5 Silicone oil emulsion *** | | | | | | | 60 |
| Landor ® CT (Syngenta) | 200 | 200 | 200 | 200 | 200 | 200 | 200 |
| Water | 200 | 200 | 200 | 200 | 200 | 200 | 200 |
| Dust value (Heubach test) | 0.7 | 0.1 | 0.03 | 0.3 | 0.4 | 0.2 | 0.4 |

* Trisiloxane $Me_3SiO[SiMeR^2O]SiMe_3$ where $R^2$ is based on an allyl alcohol-started polyether having ethyleneoxy units and having a number-average molar mass $M_N$ of about 400 g/mol. This corresponds to a compound of the formula $Me_3SiO[SiMeR^2O]SiMe_3$ with $R^2$ = $—CH_2CH_2CH_2O[C_2H_5O]_{7.8}H$

** according to manufacturer data contains a silicone oil emulsion (479 g/l) and a polymer dispersion based on acrylic esters (478 g/l)

*** contains 35% by weight of silicone oil (polydimethylsiloxane having a kinematic viscosity of 40 000 $mm^2/s$), 10% emulsifier (HLB about 12-13) and 45% by weight of water The reference example without further additive (dressing 0) already leads to very low dust values of 0.7 g per 100 kg of seed. Frequently, dust values exceeding 1 g per 100 kg of seed or even 2 g per 100 kg of seed are found. The additives from Examples 1 to 5 can lower the dust value further. These additives are thus all suitable as anti-dusting agents. In the case of the polyether-modified siloxanes (Examples 1 to 3) examined, it is observed that the more silicon atoms the polyether-modified siloxane has, the lower the evolution of dust. The polyether-modified siloxane having the highest number of silicon atoms (Example 1) correspondingly shows the lowest dust value. The polyether-modified siloxanes also have the advantage that the mixing drum of the seed-dressing system can be cleaned with water without difficulty, i.e. all residues of the dressing are easy to remove. By contrast, Examples 4 and 5 based on silicone oil emulsions present difficulties here since the silicone oil present leads to tacky residues that are difficult to remove.

The invention claimed is:

1. A method of reducing evolution of dust from seed, the method comprising:

a. providing the seed, and b. treating the seed with at least one polyether-modified siloxane;

wherein the at least one polyether-modified siloxane has 50 to 81 silicon atoms.

2. The method of reducing evolution of dust from seed according to claim 1, wherein the at least one polyether-modified siloxane is a compound of the general formula (I):

Formula (I)

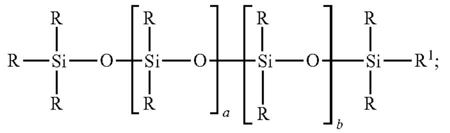

wherein:

R is in each case independently selected from the group consisting of monovalent hydrocarbyl radicals having 1 to 18 carbon atoms;

$R^1$ is in each case independently selected from the group consisting of R and $R^2$;

$R^2$ is in each case independently selected from the group consisting of monovalent polyether radicals of the general formula (II)

$$—Z[(OC_2H_3R^3)_cOR^4]_d \quad \text{Formula (II);}$$

wherein

Z is in each case independently selected from the group consisting of (d+1)-valent hydrocarbyl radicals that are optionally interrupted by oxygen atoms and have 2 to 10 carbon atoms;

$R^3$ is in each case independently selected from the group consisting of H and monovalent hydrocarbyl radicals having 1 to 8 carbon atoms;

$R^4$ is in each case independently selected from the group consisting of H, monovalent hydrocarbyl radicals having 1 to 8 carbon atoms, and acyl radicals having 1 to 8 carbon atoms; and wherein a=31 to 74;

b=6 to 50;

c=3 to 100; and d=1 to 3.

3. The method of reducing evolution of dust from seed according to claim 2, wherein R=methyl, $Z{=}{-}CH_2CH_2CH_2{-}$, $R^4$=H, and d=1.

4. The method of reducing evolution of dust from seed according to claim 2, wherein the divalent polyether radicals $(OC_2H_3R^3)_c$ are each independently selected from the group consisting of radicals of the general formula (III):

$$(OC_2H_4)_{c(1)}(OC_3H_6)_{c(2)}(OC_4H_8)_{c(3)}(OC_2H_3Ph)_{c(4)} \quad \text{Formula (III)}$$

wherein Ph is phenyl; and wherein c(1)=1 to 100;

c(2)=0 to 70;

c(3)=0 to 5;

c(4)=0 to 5;

with the proviso that:

c(1)+c(2)+c(3)+c(4)=c.

5. The method of reducing evolution of dust from seed according to claim 2, wherein c(3)=c(4)=0.

6. The method of reducing evolution of dust from seed according to claim 4, wherein c(1)/(c(2)+c(3)+c(4))=0.5 to 20.

7. The method of reducing evolution of dust from seed according to claim 2, wherein a proportion by mass of oxyethylene groups $(OC_2H_4)$ based on a total mass of all $(OC_2H_3R^3)$ groups is from 35% to 95%.

8. The method of reducing evolution of dust from seed according to claim 2, wherein a number-average molecular weight of $R^2$ is from 200 g/mol to 2500 g/mol.

9. The method of reducing evolution of dust from seed according to claim 1, wherein the at least one polyether-modified siloxane has a cloud point of at least 30 °C.

10. The method of reducing evolution of dust from seed according to claim 1, wherein a proportion by mass of the at least one polyether-modified siloxane based on a total mass of a treated seed is from 0.001 ppm to 1000 ppm.

11. The method of reducing evolution of dust from seed according to claim 1, wherein the seed is selected from the group consisting of grains from the grass family.

12. The method of reducing evolution of dust from seed according to claim 1, wherein the at least one polyether-modified siloxane has 50 to 70 silicon atoms.

13. The method of reducing evolution of dust from seed according to claim 2, wherein in the formula (I), R is methyl and $R^1$ is methyl.

14. The method of reducing evolution of dust from seed according to claim 2, wherein in the formula (II), Z is in each case independently selected from the group consisting of (d+1)-valent hydrocarbyl radicals that are optionally interrupted by oxygen atoms and have 3 carbon atoms; $R^3$ is in each case independently selected from the group consisting of H and methyl; and $R^4$ is H.

15. The method of reducing evolution of dust from seed according to claim 10, wherein the proportion by mass of the at least one polyether-modified siloxane based on the total mass of the treated seed is from 0.1 ppm to 10 ppm.

16. The method of reducing evolution of dust from seed according to claim 11, wherein the seed is selected from the group consisting of a grain of wheat, rye, barley, oat, triticale, rice, maize, and millet/sorghum.

17. A treated seed obtained by the method according to claim 1.

18. The treated seed according to claim 17, wherein the treated seed has a dust value of less than 0.7 g per 100 kg of seed.

19. The method of reducing evolution of dust from seed according to claim 1, wherein the at least one polyether-modified siloxane binds dust from the seed.

* * * * *